(12) United States Patent
Kweon et al.

(10) Patent No.: US 6,411,327 B1
(45) Date of Patent: Jun. 25, 2002

(54) STEREO CAMERA SYSTEM FOR OBTAINING A STEREO IMAGE OF AN OBJECT, AND SYSTEM AND METHOD FOR MEASURING DISTANCE BETWEEN THE STEREO CAMERA SYSTEM AND THE OBJECT USING THE STEREO IMAGE

(75) Inventors: In So Kweon; Doo Hyun Lee, both of Seoul (KR)

(73) Assignee: Korea Advanced Institute Science and Technology (KR)

(*) Notice: Subject to any disclaimer, the term of this patent is extended or adjusted under 35 U.S.C. 154(b) by 0 days.

(21) Appl. No.: 09/205,087

(22) Filed: Dec. 4, 1998

(30) Foreign Application Priority Data

Feb. 2, 1998 (KR) ............................................. 98-2787

(51) Int. Cl.[7] .......................... H04N 13/02; H04N 15/00
(52) U.S. Cl. ...................................................... 348/49
(58) Field of Search .............................. 348/42, 49, 51, 348/54; 342/176, 180; 345/9, 31–32, 139; 359/376, 462–477

(56) References Cited

U.S. PATENT DOCUMENTS

| | | | |
|---|---|---|---|
| 4,509,081 A | * | 4/1985 | Peyton et al. ................ 348/132 |
| 5,581,409 A | * | 12/1996 | Ruben .......................... 359/636 |
| 5,717,455 A | * | 2/1998 | Kamewada .................... 348/85 |
| 5,720,706 A | * | 2/1998 | Takahashi et al. ........... 600/111 |
| 5,761,337 A | * | 6/1998 | Nishimura et al. .......... 382/150 |
| 5,835,133 A | * | 11/1998 | Moreton et al. .............. 348/49 |

OTHER PUBLICATIONS

Paper of W. Teoh and X.D. Zhang entitled "An Inexpensive Stereoscopic Vision System for Robots" published in Int. Conf. Robotics, pp. 186–189, 1984.

Paper of Y. Nishimoto and Y. Shirai entitled "A Feature–Based Stereo Model Using Small Disparities" published in Proceedings in Computer Vision and Pattern Recognition, pp. 192–196, 1987.

Paper of A. Goshtasby and W.A. Gruver entitled "Design of a Single–Lens Stereo Camera System" published in Pattern Recognition, vol. 26, pp. 923–936, pp. 1993.

* cited by examiner

*Primary Examiner*—Vu Le
(74) *Attorney, Agent, or Firm*—Graybeal Jackson Haley LLP

(57) ABSTRACT

A stereo camera system for obtaining a stereo image of an object to measure distance between the stereo camera system and the object is provided. The stereo camera system 10 comprises a camera 11 and a prism 12 arranged at a desirable distance from the front side of the lens of said camera 11. The prism 11 may be a delta shaped biprism having a base 13, a first incline 14 and a second incline 15, in which both the first incline 14 and said second incline 15 obliquely face the lens of said camera 11. Alternatively, the prism may be a trigonal pyramid shaped triprism having a base and three inclines, in which the three inclines obliquely face the lens of said camera. The camera 11 may be a charge coupled device camera. The present invention also relates to a distance measurement system and a distance measurement method for measuring distance between the stereo camera system and an object using disparity of a stereo image of the object.

10 Claims, 7 Drawing Sheets

*PRIOR ART*

*PRIOR ART*

PRIOR ART

STEREO CAMERA SYSTEM FOR OBTAINING A STEREO IMAGE OF AN OBJECT, AND SYSTEM AND METHOD FOR MEASURING DISTANCE BETWEEN THE STEREO CAMERA SYSTEM AND THE OBJECT USING THE STEREO IMAGE

TECHNICAL FIELD

The present invention relates generally to a stereo camera system for obtaining a stereo image of an object to measure distance between the stereo camera system and the object using those, and more particularly, to the stereo camera system constructed to obtain the stereo image by a camera. The present invention also relates to a distance measurement system and a distance measurement method for measuring distance between the stereo camera system and an object using disparity of a stereo image of the object.

BACKGROUND ART

Disparity of a stereo image on a computer vision can be used in measuring distance between an object and a camera that obtains the stereo image by photographing the object. Disparity means distance between two homologous points on two images of an object, that is, distance between a point on a first image of a pair of stereo images and a corresponding point on a second image of the stereo images.

A conventional stereo camera system 40 used in distance measurement consists of two charge coupled device cameras (CCD camera) 41 and 42 as showed in FIG. 8. The stereo image shown in FIG. 9 is obtained as follows; one of the stereo images is obtained by photographing an object using a first camera 41, and the other is obtained by photographing the object using a second camera 42. A point 43 on the object corresponds to both a first homologous point 47 on a first image 45 and a second homologous point 48 on a second image 46. The distance between the point 43 of the object and a stereo camera system 40 is in a functional relationship with the disparity of the stereo image, that is, the distance between the first homologous point 47 and the second homologous point 48. Still, the focal length and other intrinsic parameters of each camera 41 or 42 can affect the distance between the point 43 of the object and the stereo camera system 40. Furthermore, differences between intensities of the first image 45 and the second image 46 owing to a small range of variation in the irises of the first and second cameras 41 and 42 results in not only taking much time to detect the homologous points 47 and 48 but also deteriorating reliability of such detection. Meanwhile, the method for obtaining the first image 45 by exposure using the first camera 41, and then obtaining the second image 46 by another exposure using the second camera 42 can not be applied in the dynamic situation if the object and/or the stereo camera system 40 is moved.

In consideration of the above defects of the stereo camera system, there were proposed some kinds of stereo camera systems to obtain a stereo image using only a camera, as follows.

In a paper of Y. Nishimoto and Y. Shirai which is entitled "A feature-based stereo model using small disparities" and published in Proceedings in Computer Vision and Pattern Recognition, pp. 192–196, 1987, a stereo camera system as shown in FIG. 10 is proposed. The stereo camera system 50 comprises a camera 51 and a rotary glass plate 52 arranged at a desirable distance from the front side of the lens of the camera 51. The rotary glass plate 52 swings between a first rotated position represented by a solid line and a second rotated position represented by a dotted line. As the glass plate 52 swings between the first rotated position and the second rotated position when the stereo camera system 50 is fixed, the optical axis of the lens of the camera 51 is moved slightly. A stereo image is obtained as follows. One of the stereo images is obtained by photographing an object by an exposure using the camera 51 with the glass plate 52 positioned at the first rotated position, and the other stereo image is obtained by photographing the object by another exposure using the camera 51 with the glass plate 52 positioned at the second rotated position. Since the range of disparity of the stereo image obtained by the stereo camera system 50 is very narrow, it is difficult to measure distance between the object and the stereo camera system 50 precisely. Furthermore, the stereo camera system 50 can not be applied in a dynamic situation due to the two different exposure times as is the in the aforementioned stereo camera system 40.

In a paper of W. Teoh and X. D. Zhang which is entitled "An inexpensive stereoscopic vision system for robots," published in Int. Conf. Robotics, pp. 186–189, 1984, another stereo camera system as shown in FIG. 11 is proposed. The stereo camera system 60 comprises a camera 61, a rotary glass plate 62 arranged at a desirable distance from the front side of the lens of the camera 61 and two fixed glass plates 63 and 64 disposed at both sides of the rotary glass plate 62. The stereo camera system 60 operates as the aforementioned stereo camera system 50 does except that range of disparity of the stereo image obtained by the stereo camera system 60 is broader than that by the stereo camera system 50. Accordingly, the stereo camera system 60 can not be applied at a dynamic situation due to the two different exposure times as in the aforementioned stereo camera system 40.

In a paper of A. Goshtasby and W. A. Gruver entitled "Design of a Single-Lens Stereo camera system" and published in Pattern Recognition, vol. 26, pp. 923–936, 1993, still another stereo camera system, as shown in FIG. 12, is proposed. The stereo camera system 70 comprises a camera 71 and two reflectors 72 and 73 disposed in two planes crossed with each other so that the two reflectors 72 and 73 abut against each other at their sides. The two reflectors 72 and 73 are oppositely inclined so that their specular surfaces obliquely face an object. The camera 71 is disposed to simultaneously photograph two images reflected by the specular surfaces of the two reflectors 72 and 73. Since the stereo camera system 70 photographs reflected images, that is, reversed images, any picture obtained by the stereo camera system 70 is object to an image translation process. Brightness of each image of the picture is affected by an incidence angle of a prevailing source of light to each reflector 72 or 73 because of mutual reflection between the two reflectors 72 and 73, whereby degrees of brightness of two images in the picture are different although they are obtained at a single exposure time.

SUMMARY OF INVENTION

Therefore, the present invention is aimed to make a stereo camera system for providing a frame of picture having a stereo image of an object to be constructed by only a camera.

The present invention is also aimed to provide the stereo camera system for providing a frame of picture having a stereo image by a single exposure in a dynamic situation while all images of the picture have an equivalent brightness.

In order to accomplish the above mentioned aims, this invention provides a stereo camera system for providing a frame of picture having a stereo image of an object used in distance measurement between the stereo camera system and the object. The stereo camera system comprises a camera and a prism arranged at a desirable distance from the front side of the lens of the camera.

The prism may comprise a delta shaped biprism having a base, a first incline and a second incline, in which the first incline and the second incline obliquely face the lens of the camera.

The prism may comprise a triagonal pyramid shaped triprism having a base and three inclines, in which the three inclines obliquely face the lens of the camera.

The invention also provides a system for measuring distance between a stereo camera system and an object using disparity of a stereo image of the object obtained by the stereo camera system and the object, in which the stereo camera system comprises a camera and a prism arranged at a desirable distance from the front side of the lens of the camera. The distance measurement system comprises means for obtaining a frame of picture comprising the stereo image by a single shot using said stereo camera system; means for detecting homologous points on the stereo image, in which the homologous points correspond to a point on the object; means for measuring distance between the homologous point; and means for calculating the distance between said stereo camera system and the object from the distance between the homologous point.

If the prism of said stereo camera system comprises a delta shaped biprism having a base, a first incline and a second incline, in which the first incline and the second incline obliquely face the lens of the camera, there are provided stereo images of the object by the means for obtaining a frame of picture.

If the prism of said stereo camera system comprises a triagonal pyramid shaped triprism having a base and three inclines, in which the three inclines obliquely face the lens of said camera, there are provided triple images of the object are obtained by the means for obtaining a frame of picture.

The invention also provides a distance measurement method for measuring distance between a stereo camera system and an object using disparity of a stereo image of the object obtained by the stereo camera system and the object. The method comprises steps for providing the stereo camera system comprising a camera and a prism arranged at a desirable distance from the front side of the lens of said camera; obtaining a frame of picture comprising the stereo image by a single shot using said stereo camera system; detecting homologous points on the stereo image, in which the homologous points correspond to a point on the object; measuring distance between the homologous point; and calculating the distance between said stereo camera system and the object from the distance between the homologous point.

The method may further comprise steps for obtaining information in relation to distance between the stereo camera system and each of plural points on the object by repeating the steps for detecting homologous points, measuring distance between the homologous point and calculating the distance between said stereo camera system and the object; calculating magnification between life-size and imaginal size of the object; and calculating three dimensional size of the object from the information in relation to distance between the stereo camera system and each of plural points on the object, and the magnification between life-size and imaginal size of the object.

Other advantages and features of the present invention will become apparent from the following description, including the drawings and claims.

DETAILED DESCRIPTION OF PREFERRED EMBODIMENTS

Figure 1:
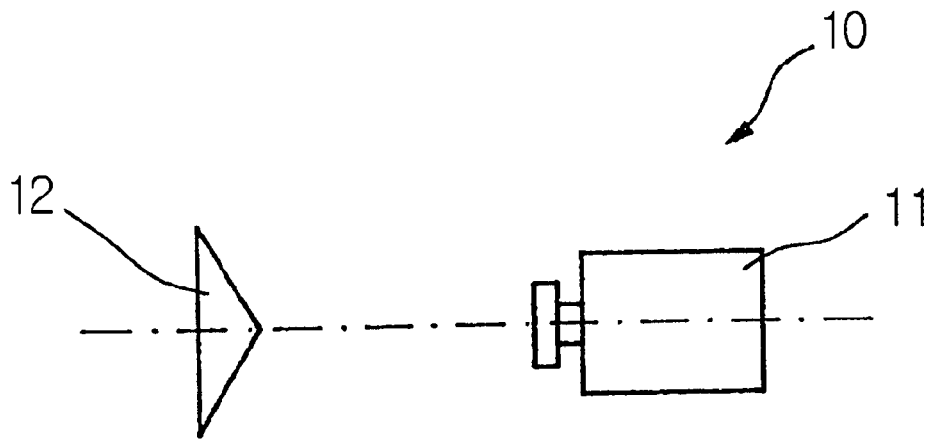
FIG. 1 is a schematic drawing showing construction of a first embodiment of a stereo camera system according to the present invention.
Figure 2:
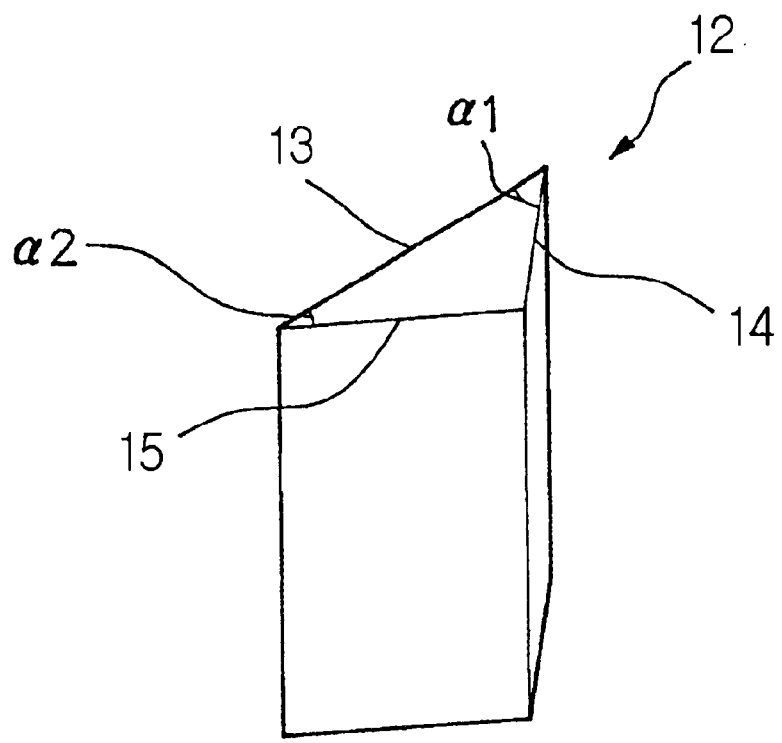
FIG. 2 shows a perspective view of a prism of the stereo camera system showed in FIG. 1.

As shown in FIGS. 1 and 2, the stereo camera system 10 according to the first embodiment of the present invention comprises a camera 11 and a prism 12 disposed in front of the lens of the camera 11. The camera 11 may be a CCD camera. In this embodiment, a biprism as showed in FIG. 2 is used as the prism 12. The biprism is shaped in a delta having a base 13, a first incline 14 angled by a first interior angle $\alpha 1$ with the base 13, and a second incline 15 angled by a second interior angle $\alpha 2$ with the base 13. The prism 12 is disposed so that both the first and second inclines 14 and 15 of the prism 12 obliquely face the lens of the camera 11, more preferably, that the central line through the edge of the prism at which the first and second inclines 14 and 15 abut against each other accords with the optical axis of the lens of the camera 11.

Figure 3A:
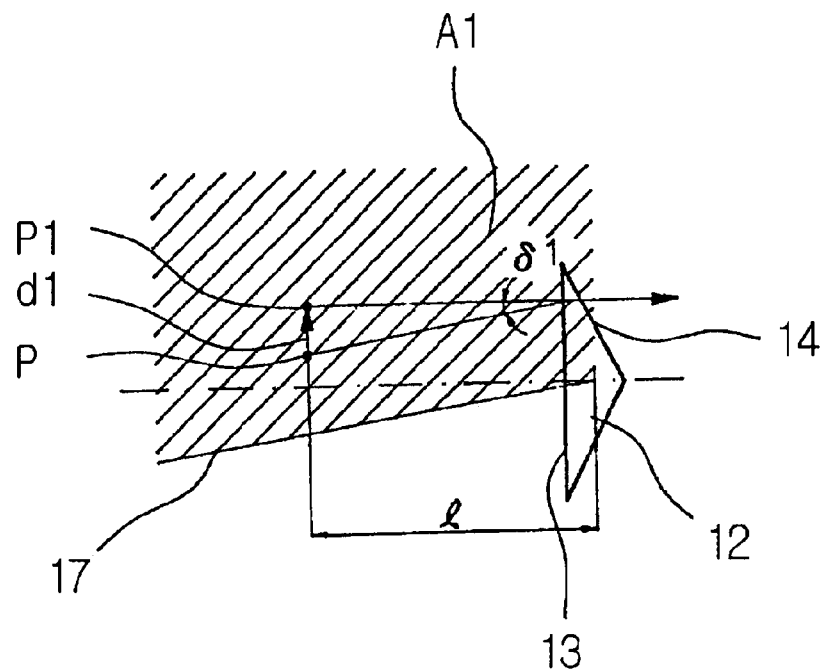
FIG. 3A shows a side view of the prism shown in FIG. 2 for explaining area projected through a first incline of the prism.

A hatched area A1 in FIG. 3A represents a zone projected through the first incline 14 of the prism 12. A point P in the hatched area A1 is projected as an imaginary point P1 is, in which the imaginary point P1 is displaced by a distance d1 from the point P. The distance d1 is in functional relationship with both distance l from the center C of the prism 12 and displacement angle $\delta 1$ of the prism 12. The lowest portion 17 of the hatched area A1 is a plane inclined by a displacement angle δ1 from a plane perpendicular to the base 13 of the prism 12. The displacement angle δ1 is in functional relationship with both a refractive index n of the prism 12 and the first interior angle α1 of the prism 12.

Figure 3B:
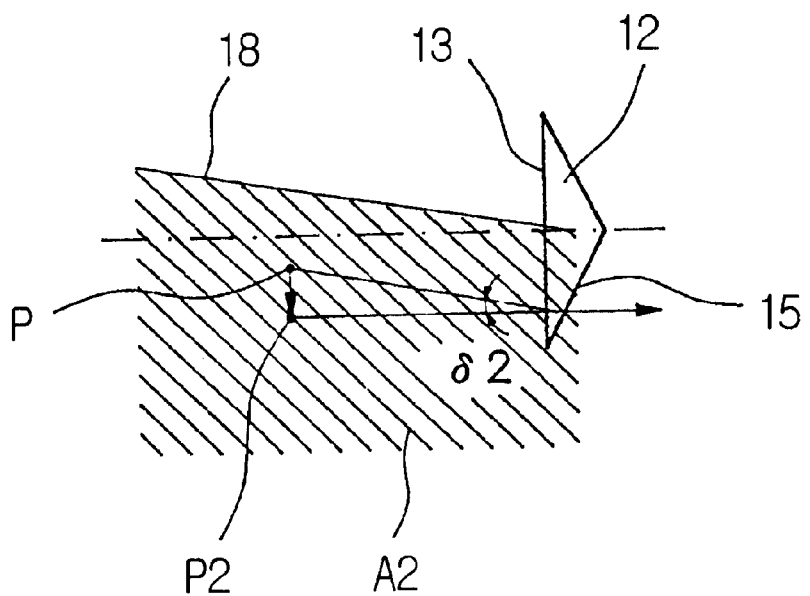
FIG. 3B shows a side view of the prism shown in FIG. 2 for explaining area projected through a second incline of the prism.

A hatched area A2 in FIG. 3B represents a zone projected through the second incline 15 of the prism 12. A point P in the hatched area A2 is projected as another imaginary point P2 is, in which the imaginary point P2 is displaced by a distance d2 from the point P. The distance d2 is in functional relationship with both distance l from the center C of the prism 12 and displacement angle δ2 of the prism 12. The highest portion 18 of the hatched area A2 is a plane inclined by a displacement angle δ2 from a plane perpendicular to the base 13 of the prism 12. The displacement angle δ2 is in functional relationship with both a refractive index n of the prism 12 and the second interior angle α2 of the prism 12.

Figure 3C:
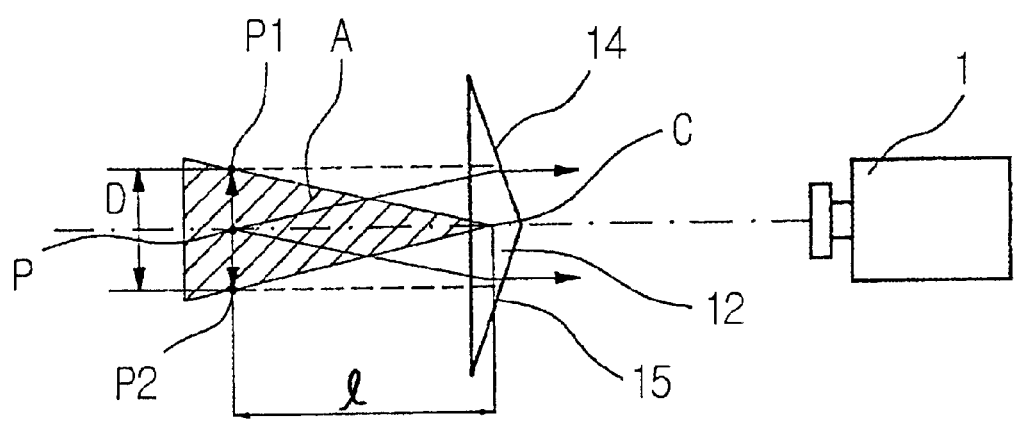
FIG. 3C shows a side view of the prism shown in FIG. 2 for explaining area projected through the first and the second inclines of the prism.
Figure 4:
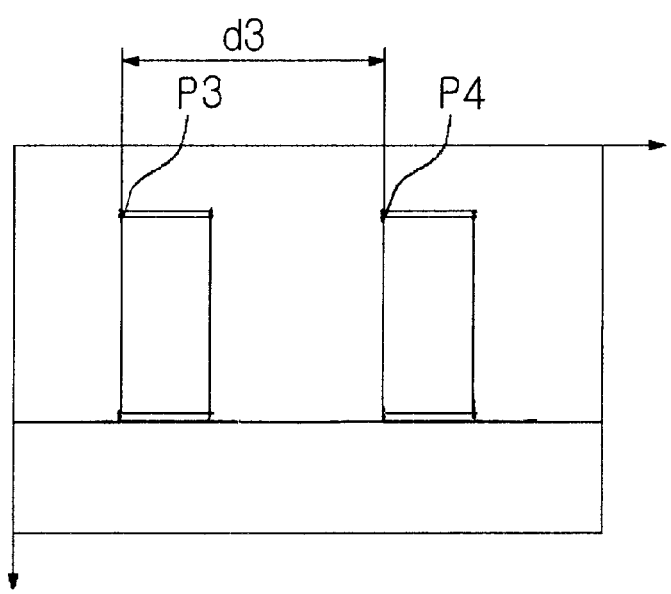
FIG. 4 is a drawing of a stereo image of an object photographed by the stereo camera system shown in FIG. 1.

A hatched area A in FIG. 3C represents a common zone, that is, an overlapped zone of the hatched area A1 in FIG. 3A and the hatched area A2 in FIG. 3B. In other words, a point P in the hatched area A is projected as two imaginary points P1 and P2 displaced by each distance d1 or d2 are. Thus, an object in the hatched area A in FIG. 3C can be photographed to produce two images in a frame of picture obtained by a single exposure. The two images, so called stereo images, constitute a stereo image of the object. Distance d3 between homologous points P3 and P4 in the stereo images corresponding to a point on the object, that is, disparity of the stereo image is proportionate to a joined length of the distances d1 and d2. In other words, the distance d3 between the homologous points P3 and P4 is in functional relationship with both the distance l from the center C of the prism 12 and the displacement angles α1 and α2 of the prism 12. Accordingly, distance between the stereo camera system 10 of this embodiment and the object can be calculated from the distance d3 between the homologous points P3 and P4 in the stereo images.

In a stereo image obtained by the stereo camera system 10 of this embodiment, both the homologous point P3 and P4 are positioned on a row in a rectangular coordinate system that comprises an axis parallel with a corner of the prism 12 at which the first incline 14 and the second incline 15 abut against each other. Provided that transparency throughout the prism 12 is even, brightness of one stereo image in a frame of picture is identical with that of the other.

<Second Embodiment>

Figure 5:
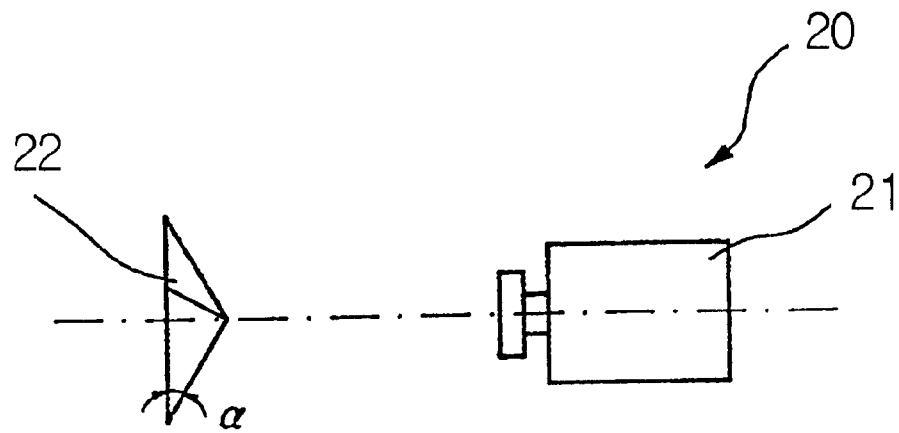
FIG. 5 is a schematic drawing showing construction of a second embodiment of a stereo camera system according to the present invention.
Figure 6:
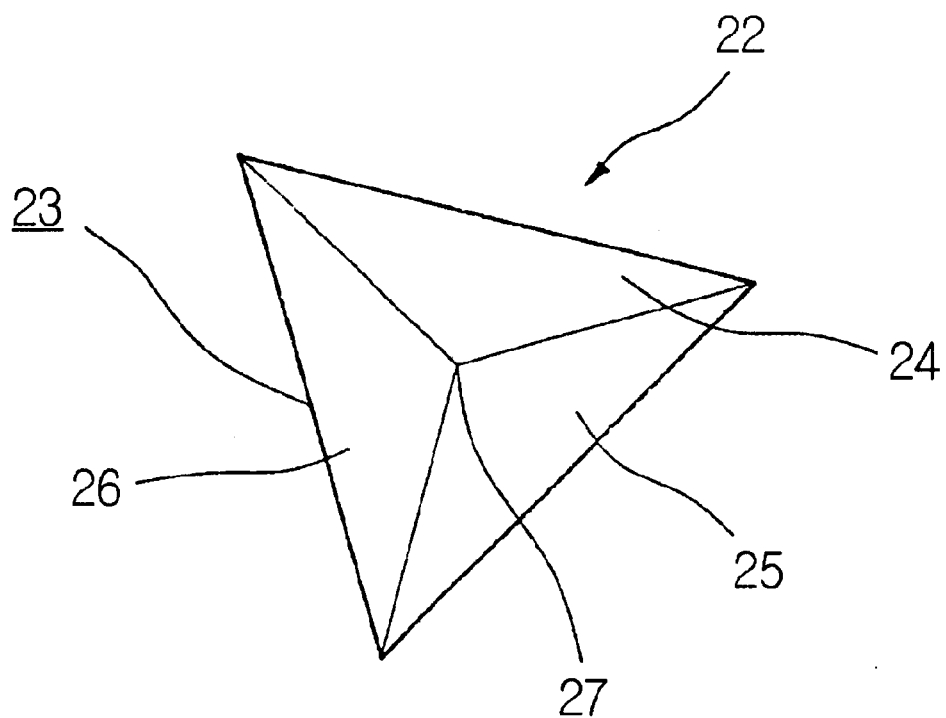
FIG. 6 shows a perspective view of a prism of the stereo camera system shown in FIG. 5.
Figure 7:
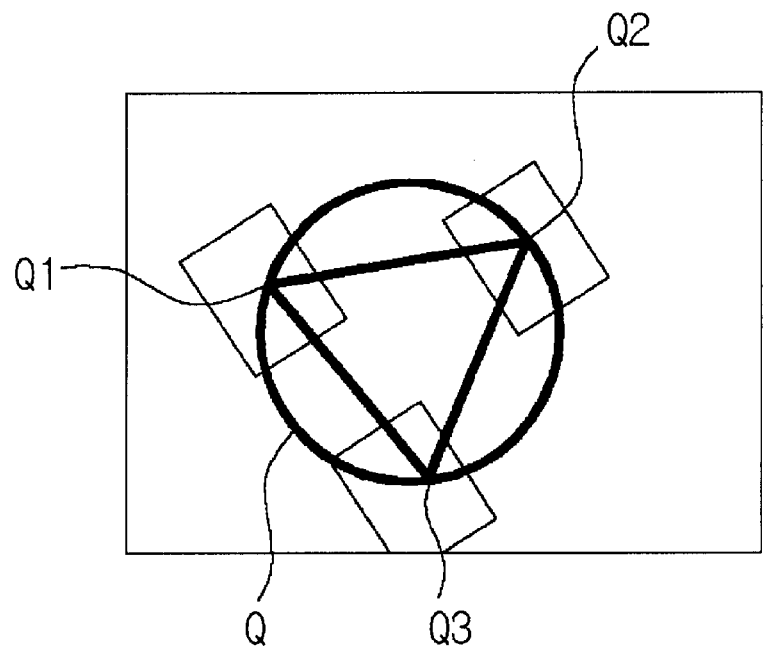
FIG. 7 is a drawing of triple images of an object photographed by the stereo camera system shown in FIG. 5.
Figure 8:
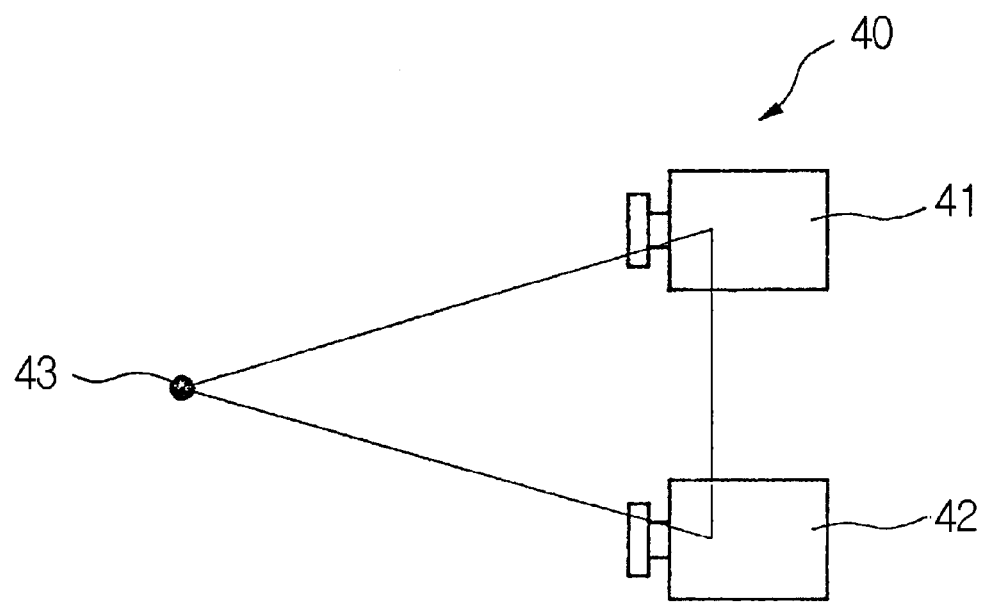
FIG. 8 is a schematic drawing showing construction of a conventional stereo camera system for obtaining a stereo image of an object.
Figure 9:
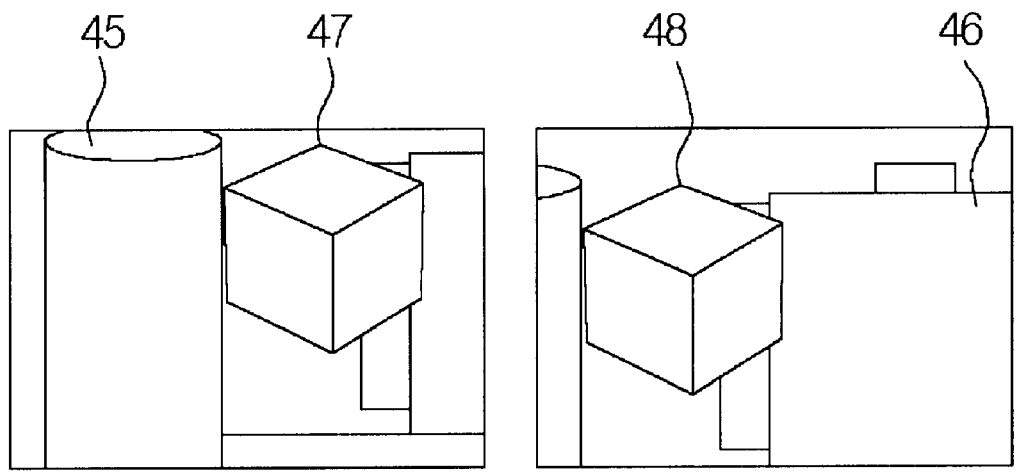
FIG. 9 is a drawing of first and second images of an object photographed by two cameras of the stereo camera system shown in FIG. 8.
Figure 10:
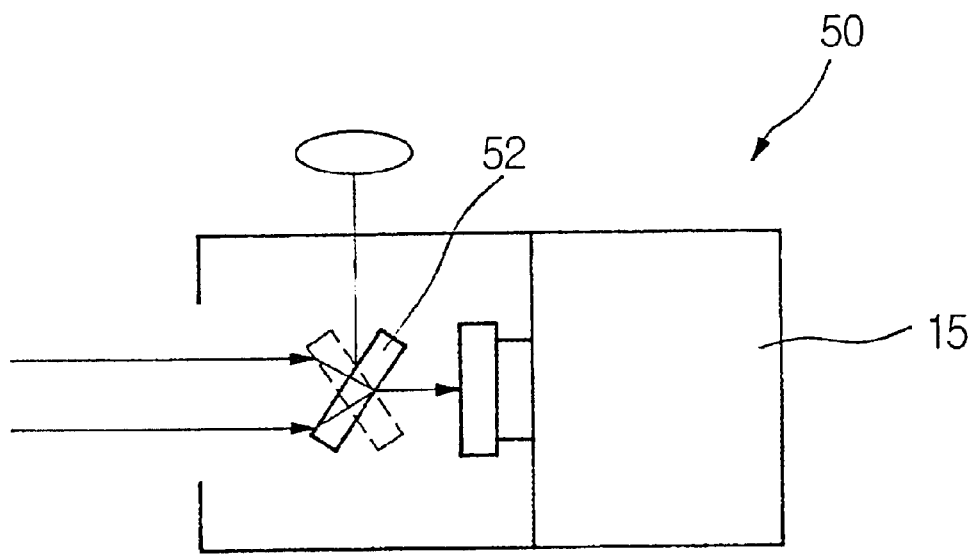
FIG. 10 is a schematic drawing showing construction of another conventional stereo camera system for obtaining a stereo image of an object.
Figure 11:
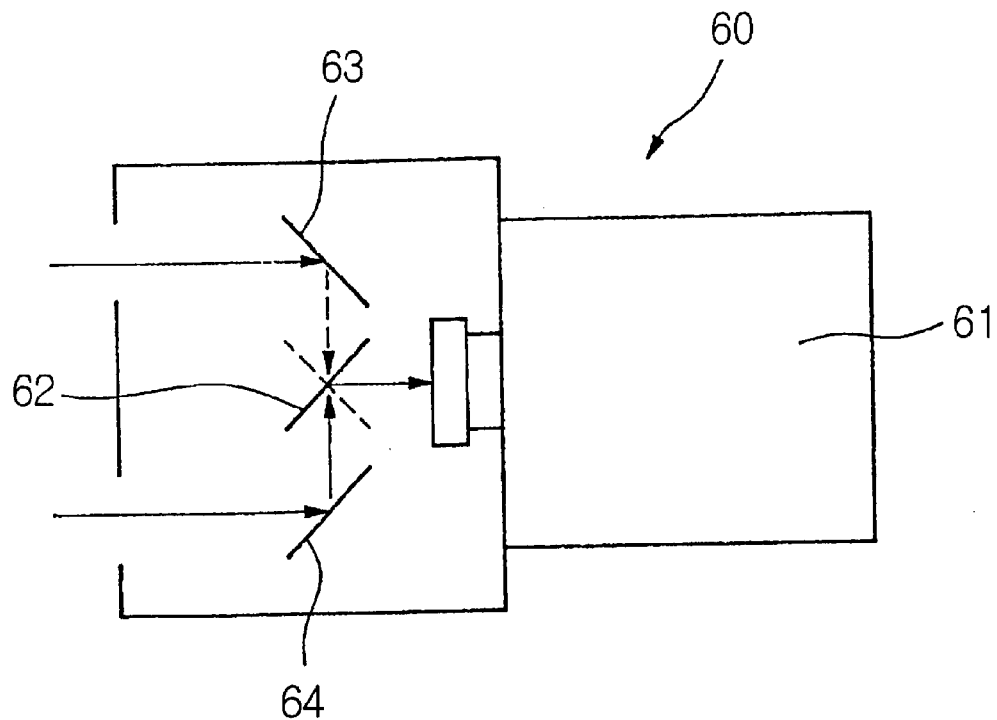
FIG. 11 is a schematic drawing showing construction of another conventional stereo camera system for obtaining a stereo image of an object.
Figure 12:
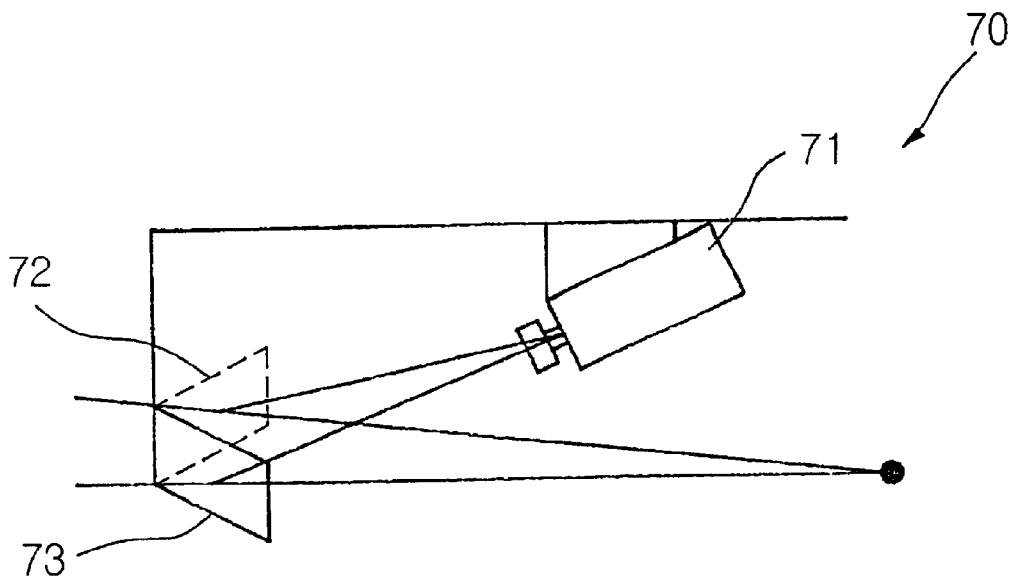
FIG. 12 is a schematic drawing showing construction of another conventional stereo camera system for obtaining a stereo image of an object.

As showed in FIGS. 5 and 6, the stereo camera system 20 according to the second embodiment of the present invention comprises a camera 21 and a prism 22 disposed in front of the lens of the camera 21. The camera 21 may be a CCD camera. In this embodiment, a triprism as showed in FIG. 6 is used as the prism 22. The triprism is shaped in a equilateral triagonal pyramid having a base 23, three inclines 24, 25 and 26 angled by a constant interior angle α with the base 23. The prism 22 is disposed so that the three inclines 24, 25 and 26 of the prism 22 obliquely face the lens of the camera 21, more preferably, that the central line through the apex of the prism at which the three inclines 24, 25 and 26 meet together accords with the optical axis of the lens of the camera 21.

In accordance with the prism's principle, explained in relation to biprism of the first embodiment, a point on the object is projected through the triprism 22 as three imaginary points are. That is, using the stereo camera system 20 of this embodiment, it is able to obtain triple images of the object in a frame of picture photographed by a single exposure. A circle Q through three homologous point Q1, Q2 and Q3 on the triple images corresponding a point on the object has a diameter in functional relationship with both distance between the object and the center of the prism 22, and displacement angle of the prism 22. Accordingly, distance between the stereo camera system 20 of this embodiment and the object can be calculated from the diameter of the circle Q.

A distance measurement system and a distance measurement method using the stereo camera system will not be specifically explained herein because any conventional constituent, means or process except for the stereo camera system can be used for the distance measurement system and method through a minor change, modulation or alteration.

As can be seen from the above explanation, a stereo camera system can be simply constituted from only a camera and a prism according to the present invention. Since a frame of picture including a stereo image, that is stereo images or triple images of an object can be obtained by a single exposure, it is able to accurately measure distance between the object and the camera system under dynamic conditions that the camera system and/or the object are moved. Moreover, equivalence of brightness between the stereo images or triple images results in swiftness of detection of homologous points in the images and subsequent processes, whereby it is able to measure the distance in real time.

Furthermore, it is able to calculate three-dimensional sizes of an object from distance information about several points on the object. The present invention does not deal with an algorithm for such a calculation.

Although the above detailed explanation for the present invention is relied on several preferred embodiments, these are not for limiting but for exemplifying the present invention. Variable alterations, changes or modulations within the technical idea of the present invention will be apparent to one skilled in this technical field.

What is claimed is:

1. A stereo camera system for providing a frame of a picture having a stereo image of an object used in the measurement of distance between the stereo camera system and the object, wherein said stereo camera system has a front side and comprises:

a camera having a lens; and a prism comprising a trigonal pyramid shaped triprism having a base and three inclines, wherein the prism has a refractive index n and is arranged at a desirable distance from the front side of the lens of said camera such that said three inclines obliquely face the lens of said camera and the stereo image is projected into the camera via optical paths by means of said prism.

2. A stereo camera system according to claim 1, wherein said camera is a charge coupled device camera.

3. A distance measurement system for measuring distance between a stereo camera system and an object using disparity of a stereo image of the object obtained by the stereo camera system and the object, wherein:

said stereo camera system comprises a camera and a prism arranged at a desirable distance from the front side of the lens of said camera; and said system for measuring distance comprises:

means for obtaining a frame of a picture comprising the stereo image by a single shot using said stereo camera system; and means for detecting homologous points on the stereo image, in which the homologous points correspond to points on the object; and means for measuring distance between the homologous points; and means for calculating the distance between said stereo camera system and the object from the distance between the homologous points.

4. A distance measurement system for measuring distance between a stereo camera system and an object according to claim 3, wherein said prism of said stereo camera system comprises a delta shaped biprism having a base, a first incline and a second incline, in which said first incline and said second incline obliquely face the lens of said camera so that stereo images of the object are obtained by said means for obtaining a frame of picture.

5. A distance measurement system for measuring distance between a stereo camera system and an object according to claim 4, wherein said camera is a charge coupled device camera.

6. A distance measurement system for measuring distance between a stereo camera system and an object according to claim 3, wherein said prism of said stereo camera system comprises a trigonal pyramid shaped triprism having a base and three inclines, in which said three inclines obliquely face the lens of said camera so that triple images of the object are obtained by said means for obtaining a frame of a picture.

7. A distance measurement system for measuring distance between a stereo camera system and an object according to claim 6, wherein said camera is a charge coupled device camera.

8. A distance measurement system for measuring distance between a stereo camera system and an object according to claim 3, wherein said camera is a charge coupled device camera.

9. A distance measurement method for measuring distance between a stereo camera system and an object using disparity of a stereo image of the object obtained by the stereo camera system and the object, wherein the method comprises the steps of:

providing the stereo camera system comprising a camera and a prism arranged at a desirable distance from the front side of the lens of said camera; and obtaining a frame of a picture comprising the stereo image by a single shot using said stereo camera system; and detecting homologous points on the stereo image, in which the homologous points correspond to points on the object; and measuring distance between the homologous points; and calculating the distance between said stereo camera system and the object from the distance between the homologous points.

10. A distance measurement method for measuring distance between a stereo camera system and an object according to claim 9, wherein the method further comprises the steps of:

obtaining information in relation to distance between the stereo camera system and each of plural points on the object by repeating the steps for detecting homologous points, measuring distance between the homologous points and calculating the distance between said stereo camera system and the object; and calculating the magnification between the life-size and the imaginal size of the object; and calculating the three-dimensional size of the object from the information in relation to the distance between the stereo camera system and each of plural points on the object, and the magnification between life-size and imaginal size of the object.

* * * * *